Patented June 8, 1937

2,082,797

UNITED STATES PATENT OFFICE 2,082,797

CELLULOSE ETHERS

Frederick C. Hahn, Wilmington, Del., assignor to E. I. du Pont de Nemours & Company, Wilmington, Del., a corporation of Delaware No Drawing. Application December 8, 1932, Serial No. 646,300

2 Claims. (Cl. 260—152)

This invention relates to new cellulose ethers and, more particularly, to cellulose ethers in which the hydrogen atom of at least one hydroxyl group is replaced by an ether-forming, open chain, unsaturated organic radical having at least four carbon atoms, to the method of preparing such ethers, and to the use of such ethers in coating and plastic compositions. This application is a continuation in part of my co-pending application Serial No. 460,787, filed June 12, 1930, and entitled "Crotyl cellulose".

An object of this invention is the provision of new cellulose ethers as above described and the provision of a suitable method of preparing such ethers. Another object is the formulation of these ethers into coating and plastic compositions. Other objects will be apparent from the description given hereinafter.

The above objects are accomplished according to the present invention by reacting cellulose, pre-treated or not, with an unsaturated open chain organic compound having a halogen atom attached to a carbon atom attached to other atoms only by single bonds, at elevated temperature and pressure in the presence of an alkali, and subsequently isolating the cellulose ether formed, and by formulating said cellulose ether into coating and plastic compositions.

While some yield of the cellulose ethers may be obtained carrying out the reaction at atmospheric pressure, it is preferred to carry out the reaction in an autoclave at a temperature of 70°–170° C.

For example, a mixture of crotonyl chloride, (by the term "crotonyl" is meant the alkyl radical $CH_3CH=CH—CH_2—$ sometimes referred to as crotyl) cellulose, sodium hydroxide, water, and benzene refluxed at atmospheric pressure produces crotonyl cellulose very slowly, a 7% yield of crotonyl cellulose at the end of twenty hours heating being usual. It has been discovered, however, that by conducting the reaction in a closed vessel and increasing the temperature to 140°–150° C., good yields of crotonyl cellulose are obtained in shorter periods of time. It is desirable to have a small amount of water present in order to have the reaction proceed satisfactorily, but a large excess is to be avoided because of the formation of excessive amounts of crotonyl alcohol by hydrolysis of the crotonyl halide.

The following examples are given to illustrate preferred methods of preparing the cellulose ethers of the present invention:—

Example 1.—A mixture of 105 g. cellulose (cotton linters), 700 g. crotonyl chloride, 870 g. benzene, 400 g. sodium hydroxide, and 50 g. water was heated with stirring in a nickel autoclave at 140°–150° C. for eight hours. The maximum pressure developed during the reaction was 150 pounds per square inch. Steam distillation was then applied to remove benzene, unreacted crotonyl chloride, and volatile products from the reaction mixture. The crotonyl cellulose and unreacted cellulose, which separated as a resinous mass during steam distillation, were separated from the residue by decanting off the remaining liquid, were washed thoroughly with water, and were then dried. The crotonyl cellulose was separated from the unreacted cellulose by dissolving it in alcohol. In this manner 199 g. of crotonyl cellulose was obtained and 3 g. of cellulose was recovered.

Example 2.—A mixture containing 105 g. cellulose, 700 g. crotonyl chloride, 870 g. benzene, 400 g. sodium hydroxide, 100 g. water, and 100 g. potassium chloride was heated with stirring in a nickel autoclave for eight hours at 140–150° C. The potassium chloride was added with the object of increasing the rate of crotonylation. When the reaction mixture was treated as in Example 1, 173 g. crotonyl cellulose and 11 g. unreacted cellulose were obtained.

Example 3.—Two hundred and fifty parts of air dried wood pulp in board form is soaked in 50 percent caustic soda solution for one hour, pressed to 1,056 parts, and shredded for one-half hour. The resulting alkali cellulose contains approximately 22% cellulose, 42% caustic soda, and 36% water. Nine hundred and three parts of the shredded alkali cellulose, 421 parts of solid caustic soda, 320 parts water, 1,600 parts of benzene, and 1,200 parts of crotonyl chloride are charged into an autoclave, agitated, and heated for 6 hours at 130–150° C. The reaction mixture is worked up in the usual manner. The product is soluble in benzene, ethyl acetate, acetone, et cetera.

Example 4.—One hundred parts of cellulose, 700 parts of crotonyl chloride, and 700 parts of benzene are added to an autoclave. The mixture is stirred and warmed to 50–60° C. A solution of 400 parts of caustic soda in 200 parts of water (at elevated temperature) is added gradually to the mixture in the autoclave. The contents of the autoclave are then heated and agitated for 6–8 hours at 130–160° C. The reaction mixture is treated in the usual way. The product is similar to those obtained in the preceding examples.

Instead of starting with cellulose, a pretreated cellulose containing a small amount of substituted group may be used. As examples of such pretreated cellulose there may be used:—(1) a low substituted glycol cellulose, prepared by the action of ethylene glycol on alkali cellulose or cellulose, containing in the neighborhood of one hydroxyethyl group per $C_{24}$ unit of cellulose; (2) a low methylated cellulose, prepared by the action of a methylating agent on alkali cellulose, containing one or less methyl groups per $C_6$ unit of cellulose; a higher methylated cellulose can, of course, be used, in which case there are fewer unsaturated groups in the final product; (3) a low formylated cellulose, prepared by the action of 80–100 percent formic acid on cellulose, containing 3–12 percent combined formic acid. There are many other pretreatments of cellulose that may be used with advantage inasmuch as such treated celluloses etherify more readily than the untreated celluloses. The following examples illustrate such alkenylations of pretreated cellulose:—

*Example 5.*—One hundred and seventeen parts of monoethyl cellulose, 700 parts of crotonyl chloride, and 700 parts of benzene are added to an autoclave. The mixture is stirred and warmed to 50–60° C. A solution of 400 parts of caustic soda in 200 parts of water (at elevated temperature) is added gradually to the mixture in the autoclave. The contents of the autoclave are then heated and agitated for 6–8 hours at 130–160° C. The reaction mixture is treated in the usual way. The product obtained is methyl crotonyl cellulose which is similar in its properties to the products obtained in the preceding examples.

*Example 6.*—One hundred and six parts of glycol cellulose, 700 parts of crotonyl chloride, and 700 parts of benzene are added to an autoclave. The mixture is stirred and warmed to 50–60° C. A solution of 400 parts of caustic soda in 200 parts of water (at elevated temperature) is added gradually to the mixture in the autoclave. The contents of the autoclave are then heated and agitated for 6–8 hours at 130–160° C. The reaction mixture is treated in the usual way. The product, crotonyl glycol cellulose, is similar in properties to the product of the preceding examples.

The following examples illustrate the preparation of other cellulose ethers coming within the scope of the present invention:—

*Example 7.*—One thousand parts of an alkali cellulose prepared as described in Example 3, containing about 22 percent cellulose, 42 percent caustic soda, and 36 percent water, 400 parts of solid caustic soda, 300 parts water, 1400 parts 2-chloroisobutylene, and 1200 parts of benzene are mixed and heated in an autoclave for 6–20 hours at 100–160° C. The isobutenyl ether of cellulose thus obtained, after purification by the usual procedures, is soluble in aromatic hydrocarbons, ester solvents, and ketones.

*Example 8.*—Fifty parts cellulose, 100 parts water, 200 parts caustic soda, 500 parts 5-bromopentene-1, and 350 parts benzene are mixed at 70–125° C. for 16–20 hours. The resulting pentenyl ether of cellulose is soluble in aromatic hydrocarbons, ester solvents, and ketones.

This invention relates in its broader phases to cellulose ethers in which the hydrogen atom of at least one hydroxyl group is replaced by an ether-forming, open chain, unsaturated organic radical containing at least four carbon atoms. The foregoing examples specifically disclose the preparation of various ethers coming within this classification. Other ethers of this type may be prepared by reacting cellulose, pretreated or not, with different unsaturated organic halides. Other halides which may be used include 6-iodohexene-2, 1-bromo-2, 3-dimethylbutene-2, 1-bromobutene-2, 1-iodobutene-2, β-chloroethyl vinyl ether, 2-chloromethylbutene-1, 1-bromo-3-ethylpentene-2. Among the higher organic halides may be mentioned 6-bromo-methyl-tridecene-6, which can be prepared from 6-methyloltridecene-6 by heating with aqueous hydrobromic acid. In general the unsaturated halides represented by the formula X—C—C=C, X representing a halogen atom, are preferred because of their reactivity. For the same reason, halides having from four to twelve carbon atoms are also preferred.

Mixed unsaturated ethers of cellulose may be prepared by treating cellulose with a mixture of the unsaturated halides in the presence of a base. Also, mixed ethers containing both saturated and unsaturated groups may be produced by using a mixture of saturated and unsaturated halides, for example, methyl and crotonyl chlorides, ethyl and crotonyl chlorides, or benzyl and crotonyl chlorides.

*Example 9.*—One hundred parts of cellulose, 450 parts of crotonyl chloride, 255 parts of benzyl chloride, and 700 parts of benzene are added to an autoclave. The mixture is stirred and warmed to 50–60° C. A solution of 400 parts of caustic soda in 200 parts of water (at elevated temperature) is added gradually to the mixture in the autoclave. The contents of the autoclave are then heated and agitated for 6–8 hours at 130–160° C. The reaction mixture is treated in the usual way. The product, monobenzyl crotonyl cellulose, is characterized by greater solubility in aromatic hydrocarbons and by improved water resistance.

The properties of the unsaturated ethers may be modified and improved in some respects also by subjecting them to esterifying reagents. Such treatments result in cellulose derivatives containing both ester groups and unsaturated ether groups.

Many different types of cellulose may be used. e. g., cotton linters, sulfite pulp, soda pulp, cellulose from bagasse, arundo donax, or any other source of cellulose. High alpha cellulose produced by the known procedures from any of these types of cellulose is suited as a raw material for the present invention. Low viscosity, high alpha cellulose prepared by the various known processes is particularly suited to the preparation of certain types of unsaturated ethers for certain purposes. In the preparation of the alkali cellulose considerable variation in the character of the cellulose may be effected prior to etherification. For example, ageing the alkali cellulose prior to etherification increases reactivity of the cellulose, lowers viscosity, and permits control of viscosity of the resulting cellulose ether.

Various pretreated celluloses may be used as a starting material; for example, cellulose pretreated with hydrogen chloride gas, dilute aqueous acids, nitric acid vapor, oxides of nitrogen, acetic and/or formic acids in the vapor or liquid states, et cetera. Various pretreated celluloses containing a small amount of substituted groups may be used; for example, low alkylated cellulose, low benzylated, low substituted glycol cellulose, low acetylated cellulose, low formylated cellulose, and many other pretreated celuloses which contain a small proportion of substituted groups.

The cellulose ethers of the present invention give clear films which are characterized by their hardening on ageing, which is not so of the cellulose ethers in which the ether-forming radical is saturated or an aryl derivative. This hardening characteristic is particularly true of those cellulose ethers in which the number of carbon atoms in the ether-forming radical is comparatively low, i. e., where the unsaturated characteristic of the radical is more marked. An example of such an ether is contronyl cellulose.

Crotonyl cellulose is compatible with a number of resins, oils, cellulose derivatives including cellulose nitrate, and softeners. This makes it possible to modify the properties of its films in many ways. The use of a softener, e. g., dibutyl phthalate, tricresyl phosphate, or castor oil in crotonyl cellulose films slows up their drying rate and retards their change to the insoluble form. However, the resultant films remain flexible for a much longer period than those containing only crotonyl cellulose. The incorporation of resins, for example, rosin, damar, or resins of the polyhydric alcohol-polybasic acid type gives films which dry more rapidly than those of crotonyl cellulose and which show better adhesion to metals, glass, and wood. The incorporation of drying oils gives hard, tough films which dry satisfactorily and become insoluble fairly rapidly.

Typical coating compositions containing crotonyl cellulose are given in the following examples:

Example 10

| | Parts |
|---|---|
| Crotonyl cellulose | 10 |
| Cellulose nitrate | 10 |
| Ethyl acetate | 35 |
| Butyl acetate | 14 |
| Cellosolve acetate | 3 |
| Bayway naphtha | 9 |

This lacquer gives clear films which become tack-free within thirty minutes. The films are very hard and are quite tough.

Example 11

| | Parts |
|---|---|
| Crotonyl cellulose | 10 |
| Rosin | 10 |
| Dibutyl phthalate | 1 |
| Ethyl acetate | 20 |
| Butyl acetate | 10 |
| Toluene | 5 |

This lacquer gives clear films which become tack-free within six hours.

Example 12

| | Parts |
|---|---|
| Crotonyl cellulose | 10 |
| Cellulose nitrate | 3 |
| Dibutyl phthalate | 2 |
| Blown linseed oil | 4 |
| Zinc oxide | 7 |
| Ethyl acetate | 40 |
| Butyl acetate | 15 |
| Toluene | 10 |

The advantages of crotonyl cellulose are best illustrated by comparing it with cellulose nitrate. Crotonyl cellulose has a wider solubility range than cellulose nitrate and compositions containing it can be formulated with cheaper solvents. Crotonyl cellulose is more stable and much less flammable than cellulose nitrate. Crotonyl cellulose becomes insoluble on exposure to air and/or exposure to actinic light. Other advantages of crotonyl cellulose are its compatibility with raw linseed oil and its excellent color stability.

As many apparently widely different embodiments of this invention may be made without departing from the spirit and scope thereof, it is to be understood that the invention is not limited to the specific embodiments thereof except as defined in the appended claims.

I claim:
1. An alcohol-soluble crotonyl ether of cellulose obtainable by the reaction of crotonyl chloride on cellulose in the presence of a fixed caustic alkali at a temperature between 120° C. and 170° C. in a closed container said ether being capable of hardening on ageing.

2. A crotonyl ether of cellulose obtainable by the reaction of crotonyl chloride on cellulose in the presence of a fixed caustic alkali at a temperature between 120° C. and 170° C. in a closed container, said ether being soluble in a member of the group consisting of alcohol, benzene, ethyl acetate and acetone, and being capable of hardening on ageing.

FREDERICK C. HAHN.